United States Patent
Nagata et al.

(10) Patent No.: US 8,811,261 B2
(45) Date of Patent: Aug. 19, 2014

(54) RADIO BASE STATION APPARATUS, RADIO RELAY STATION APPARATUS, AND RESOURCE ALLOCATION METHOD

(75) Inventors: Satoshi Nagata, Tokyo (JP); Sangiamwong Jaturong, Tokyo (JP); Tetsushi Abe, Tokyo (JP); Nobuhiko Miki, Tokyo (JP); Yasufumi Morioka, Tokyo (JP)

(73) Assignee: NTT DoCoMo, Inc., Tokyo (JP)

(*) Notice: Subject to any disclaimer, the term of this patent is extended or adjusted under 35 U.S.C. 154(b) by 0 days.

(21) Appl. No.: 13/261,458

(22) PCT Filed: Mar. 30, 2011

(86) PCT No.: PCT/JP2011/057955
§ 371 (c)(1),
(2), (4) Date: Dec. 10, 2012

(87) PCT Pub. No.: WO2011/125702
PCT Pub. Date: Oct. 13, 2011

(65) Prior Publication Data
US 2013/0070661 A1    Mar. 21, 2013

(51) Int. Cl.
H04B 7/26      (2006.01)
H04W 88/04   (2009.01)
H04B 7/155    (2006.01)
H04W 16/26   (2009.01)
H04L 1/00       (2006.01)

(52) U.S. Cl.
CPC ............. *H04B 7/2606* (2013.01); *H04W 88/04* (2013.01); *H04B 7/155* (2013.01); *H04W 16/26* (2013.01); *H04L 2001/0097* (2013.01)
USPC .......................................... 370/315; 370/329

(58) Field of Classification Search
CPC ..... H04B 7/2606; H04B 7/155; H04W 88/04; H04W 16/26; H04W 28/04; H04W 72/04; H04W 72/042; H04W 88/08; H04L 2001/0097; H04L 5/0007
See application file for complete search history.

(56) References Cited

U.S. PATENT DOCUMENTS 7,574,179 B2 *  8/2009  Barak et al. ................... 455/101
8,467,397 B2 *  6/2013  Lysejko et al. ............. 370/395.4
8,472,339 B2 *  6/2013  Lysejko et al. ................ 370/252

(Continued)

OTHER PUBLICATIONS

R1-101273 presented at 3GPP TSG RAN WG1 Meeting #60 in San Francisco, USA, Feb. 22-26, 2010, by Panasonic, Titled "Downlink Relay Performance Evaluation", Agenda Item_7.5.2, Relaying other, as a Document for Discussion, pp. 01 to 08.*

(Continued)

*Primary Examiner* — Andrew Lai
*Assistant Examiner* — Hoyet H Andrews
(74) *Attorney, Agent, or Firm* — Osha Liang LLP

(57) ABSTRACT

To provide a radio base station apparatus, a radio relay station apparatus and a resource allocation method each which perform resource division of a backhaul sub-frame more optimally and can improve a throughput of a system, in the case of relay transmission. The radio base station apparatus according to the present invention includes: a frequency bandwidth control section configured to control a frequency bandwidth in a backhaul sub-frame, based on the number of the backhaul sub-frames, the number of mobile terminal devices, and frequency utilization efficiency of a radio link; and a transmitting section configured to transmit the backhaul sub-frame with the frequency bandwidth controlled by the frequency bandwidth control section.

7 Claims, 8 Drawing Sheets

(56) References Cited

U.S. PATENT DOCUMENTS

| | | | | |
|---|---|---|---|---|
| 2011/0211467 A1* | 9/2011 | Bhat | | 370/252 |
| 2011/0268064 A1* | 11/2011 | Chen et al. | | 370/329 |
| 2012/0082104 A1* | 4/2012 | Lysejko et al. | | 370/329 |
| 2013/0272219 A1* | 10/2013 | Singh et al. | | 370/329 |

OTHER PUBLICATIONS

R1-090222 presented at 3GPP TSG RAN WG1 Meeting #55bis in Ljubljana, Slovenia, Jan. 12-16, 2009, by LG Electronics, Titled, "Consideration on Resource Allocation for Relay Backhaul Link", Agenda Item_12.6 as a Document for Discussion, pp. 01 to 05.*

R1-101117 presented at 3GPP TSG RAN WG1 Meeting #60 in San Francisco, USA, Feb. 22-26, 2010, by Motorola, Titled, "Relay Performance Evaluation with Backhaul Subframe Dynamic Partitioning and Enhancement Techniques_System Simulations", Agenda Item_7.5.1 as a Document for Discussion, pp. 01 to 18.*

International Search Report from PCT/JP2011/057955 mailed on Apr. 26, 2011 (1 page).

Panasonic, "Downlink Relay Performance Evaluation", 3GPP TSG RAN WG1 Meeting #60, R1-101273, San Francisco, USA; Feb. 22-26, 2010 (8 pages).

Motorola, "Relay Performance Evaluation with Backhaul Subframe Dynamic Partitioning and Enhancement Techniques—System Simulations", 3GPP TSG RAN WG1 Meeting #60, R1-101117, San Francisco, USA; Feb. 22-26, 2010 (18 pages).

3GPP TR 36.814 V1.6.0; "3rd Generation Partnership Project; Technical Specification Group Radio Access Network; Further Advancements for E-UTRA Physical Layer Aspects (Release 9)"; Jan. 2010 (6 pages).

Notification of Reasons for Rejection for Japanese Application No. 2010-087263 dated Feb. 26, 2013, with English translation thereof (7 pages).

3GPP TSG RAN WG1 Meeting #55bis, R1-090222, "Consideration on Resource Allocation for Relay Backhaul Link," LG Electronics; Ljubljana, Slovenia, Jan. 12-16, 2009 (5 pages).

* cited by examiner

RADIO BASE STATION APPARATUS, RADIO RELAY STATION APPARATUS, AND RESOURCE ALLOCATION METHOD

TECHNICAL FIELD

The present invention relates to a radio base station apparatus, a radio relay station apparatus, and a resource allocation method each using relay transmission technology in a Long Term Evolution-Advanced (LTE-A) system.

BACKGROUND ART

In $3^{rd}$ Generation Partnership Project (3GPP), standardization of LTE-Advanced (LTE-A) has been advanced as a fourth generation mobile communication system for achieving, an additional high speed and high-capacity communication from Long Term Evolution (LTE) which is a developed standard of third generation mobile communication system. LTE-A has addressed an important problem for a cell end user to improve in a throughput, in addition to achieving of such a high speed and high-capacity communication, and relay technology for relaying a radio transmission between a radio base station apparatus and a mobile terminal device has been studied as a means for solving such a problem. It is expected that it can also enlarge coverage efficiently by using the relay, even at a location where securing of a wire backhaul link is difficult.

In the relay technology, there are a layer 1 relay, a layer 2 relay, and a layer 3 relay. The layer 1 relay is relay technology called a booster or a repeater, and is Amplifier and Forward (AF) type relay technology for performing power amplification of a downlink received RF signal from a radio base station apparatus and transmitting the amplified downlink received RF signal to a mobile terminal device. An uplink received RF signal from a mobile terminal device is also subjected to the power amplification similarly to be transmitted to a radio base station. The Layer 2 relay is Decode and Forward (DF) type relay technology for coding and modulating the downlink received RF signal from the radio base station apparatus again after demodulating and decoding, and transmitting the coded and modulated downlink received RF signal to the mobile terminal device. The layer 3 relay is relay technology for reproducing an user data after decoding the downlink received RF signal from the radio base station apparatus, in addition to the demodulating process and the decoding process, and then executing processes for transmitting the user data over the radio again (e.g., a secrecy process, a dividing/coupling process of the user data, etc.), and transmitting the coded/modulated user data to the mobile terminal device. Nowadays, in 3GPP, standardization with regard to the layer 3 relay technology has been advanced from viewpoints of improving in receiving characteristics due to noise elimination, reviewing of standard specification, and simplicity of implementation.

FIG. 1 is a diagram showing a brief overview of radio relay technology using the layer 3 relay. The radio relay station apparatus (Relay Node (RN)) of layer 3 relay is characterized to have a specific cell ID (Physical Cell ID (PCI)) different from that of the radio base station apparatus (evolved Node B (eNB)), in addition to executing a reproducing process, a modulation and demodulation process, and a coding and decoding processing of user data. Accordingly, the mobile terminal device (User Equipment (UE)) recognizes a cell B provided by the radio relay station apparatus as a cell different from a cell A provided by the radio base station apparatus. Moreover, since a control signal of physical layers (e.g., Channel Quality Indicator (CQI) and Hybrid Automatic Repeat reQuest (HARQ)) is terminated at the radio relay station apparatus, the radio relay station apparatus is recognized as a radio base station apparatus, as seen from the mobile terminal device. Accordingly, even the mobile terminal device having only a function of LTE can be connected to the radio relay station apparatus.

Moreover, it is assumed that a backhaul link (Un) between the radio base station apparatus and the radio relay station apparatus and an access link (Uu) between the radio relay station apparatus and the mobile terminal device is operated on a different frequency or the same frequency. In the case of the latter, if the radio relay station apparatus executes a transmission process and a reception process simultaneously, a transmitted signal is wrapped around a receiver of the radio relay station apparatus, unless sufficient isolation is securable in a transmitting and receiving circuit, and thereby causing interference. Accordingly, in the case of operation on the same frequency (f1) as shown in FIG. 2, it is necessary to perform Time Division Multiplexing (TDM) of radio resources of the backhaul link and the access link (eNB transmission and relay transmission), and control so that the transmission process and the reception process are not simultaneously executed in the radio relay station apparatus (Refer to Non Patent Literature 1.). Accordingly, the radio relay station apparatus cannot transmit a downlink signal to the mobile terminal device, during reception of a downlink signal from the radio base station apparatus, in a downlink, for example.

CITATION LIST

Non-Patent Literature

Non Patent Literature 1: 3GPP, TR36.814

SUMMARY OF THE INVENTION

Technical Problem

In the radio relay technology by using such a layer 3 relay, a sub-frame constitution of the downlink is shown in FIG. 3. In FIG. 3, there are a backhaul (MBMS over a Single Frequency Network (MBSFN)) sub-frame and a normal sub-frame each for providing a simultaneous distribution service (Multimedia Broadcast Multicast Service (MBMS)) of broadcast type contents distributed to plenty of user in a single frequency network.

In the backhaul link from a macro eNB (radio base station apparatus) to a relay node (radio relay station apparatus), data, a control signal and a reference signal (Common Reference Signal (CRS)) are transmitted by the backhaul sub-frame. In this case, the transmitted data includes data from the macro eNB to a macro UE (mobile terminal device under the command of the eNB), and data from the macro eNB to the relay node. On the other hand, in an access link in the same time, the control signal and the reference signal (CRS) are transmitted by the backhaul sub-frame, but data is not transmitted as mentioned above.

In the backhaul link, data, a control signal and a reference signal (CRS) are transmitted to the macro UE from the macro eNB by the normal sub-frame. In the access link, data, a control signal and a reference signal (CRS) are transmitted to the relay UE (mobile terminal device under the command of the relay node) from the relay node by a normal sub-frame.

As a simplest resource allocation in the backhaul sub-frame, it is assumed to allocate all resources only to the relay node, without dividing the resources. However, since the transmitting data to the relay node is proportional to the number of the relays UE (UE under the command of the radio relay station apparatus), it does not need to allocate all the resources to the relay node when in particular the relays UE is small in number. In this case, it is expectable that a throughput of the whole system (cell) increases by allocating a part of the resources to the macro UE.

The present invention has been achieved in consideration of such a point, and an object thereof is to provide a radio base station apparatus, a radio relay station apparatus and a resource allocation method each which divides resources of the backhaul sub-frame optimally in the case of relay transmission, and thereby a throughput of a system can be improved.

Solution to Problem

A radio base station apparatus according to the present invention includes: a frequency bandwidth control section configured to control a frequency bandwidth in a backhaul sub-frame, based on the number of the backhaul sub-frames, the number of mobile terminal devices, and frequency utilization efficiency of a radio link; and a transmitting section configured to transmit the backhaul sub-frame with the frequency bandwidth controlled by the frequency bandwidth control section.

A radio relay station apparatus according to the present invention includes: a buffer for storing transmitting data; an offset control section configured to control an offset for resource allocation based on a data amount in the buffer; and a transmitting section configured to transmit the offset to a radio base station apparatus.

A resource allocation method according to the present invention includes: controlling a frequency bandwidth in a backhaul sub-frame, based on the number of the backhaul sub-frames, the number of mobile terminal devices, and frequency utilization efficiency of a radio link; and transmitting the backhaul sub-frame with the frequency bandwidth controlled by the frequency bandwidth control section.

Technical Advantage of the Invention

According to the resource allocation method of the present invention, since the frequency bandwidth in the backhaul sub-frame is controlled based on the number of the backhaul sub-frames, the number of the mobile terminal devices, and the frequency utilization efficiency of the radio link, and the backhaul sub-frame is transmitted with the frequency bandwidth controlled by the frequency bandwidth control section, the resources of the backhaul sub-frame are divided optimally in the case of the relay transmission, and thereby the throughput of the system can be improved.

DESCRIPTION OF EMBODIMENTS

Hereinafter, embodiments of the present invention will now be described in detail with reference to the accompanying drawings. Hereinafter, eNB denotes a radio base station apparatus, a macro UE denotes a mobile terminal device under the command of the eNB, a relay UE denotes a mobile terminal device under the command of a radio relay station apparatus, and RN denotes the radio relay station apparatus.

Embodiment 1

In this embodiment, there will be explained the case where a frequency bandwidth in a backhaul sub-frame is controlled based on the number of the backhaul sub-frames, the number of mobile terminal devices, and frequency utilization efficiency of a radio link. Herein, the frequency utilization efficiency means frequency utilization efficiency (Spectral Efficiency (SE)) in a Modulation and Coding Scheme (MCS) mode applied to a (macro eNB→macro UE)/(macro eNB→relay node) link.

Figure 1:
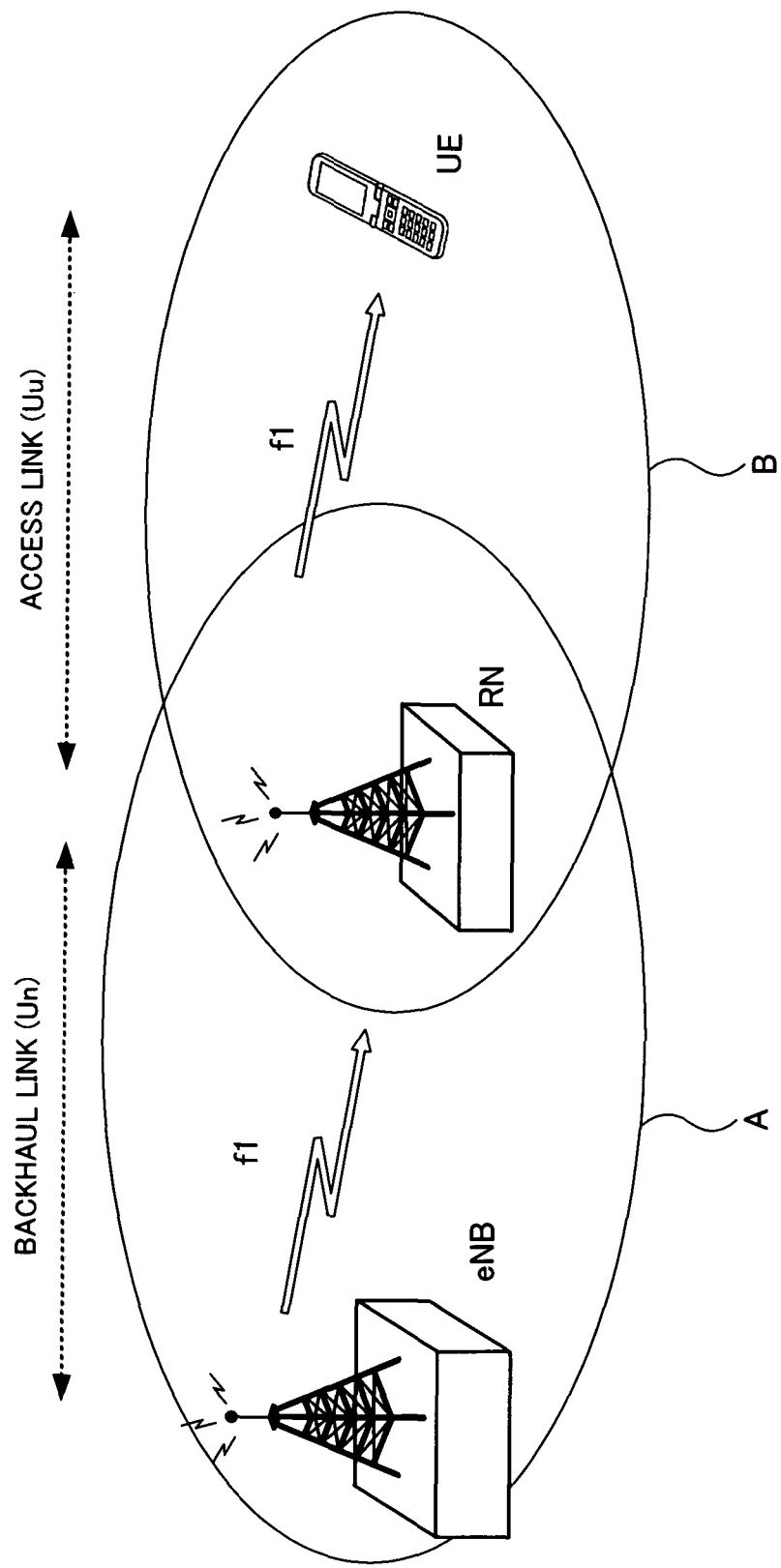
FIG. 1 is a diagram for explaining relay transmission technology.
Figure 2:
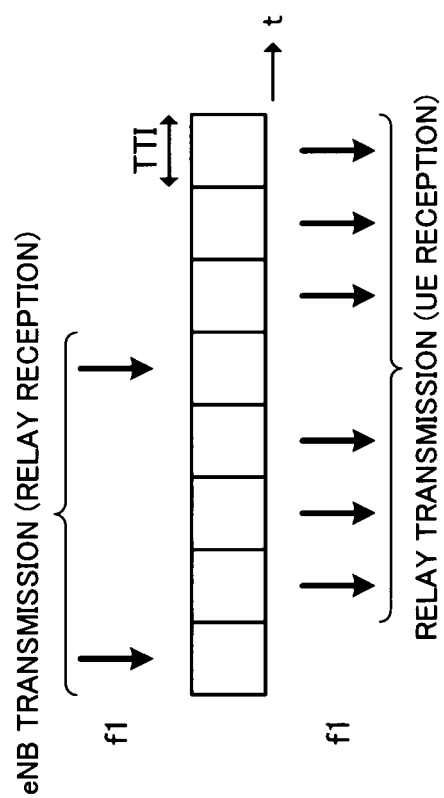
FIG. 2 is a diagram for explaining radio resources of a backhaul link and an access link.
Figure 3:
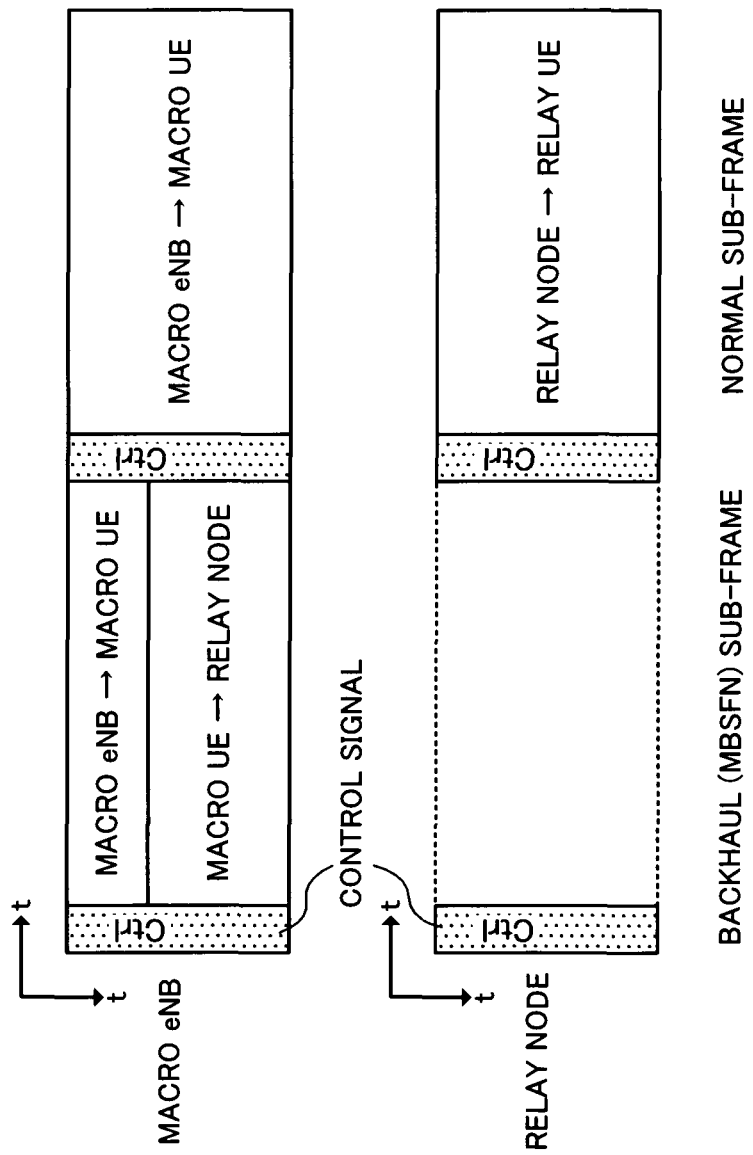
FIG. 3 is a diagram for explaining a sub-frame constitution of the backhaul link and the access link.
Figure 4:
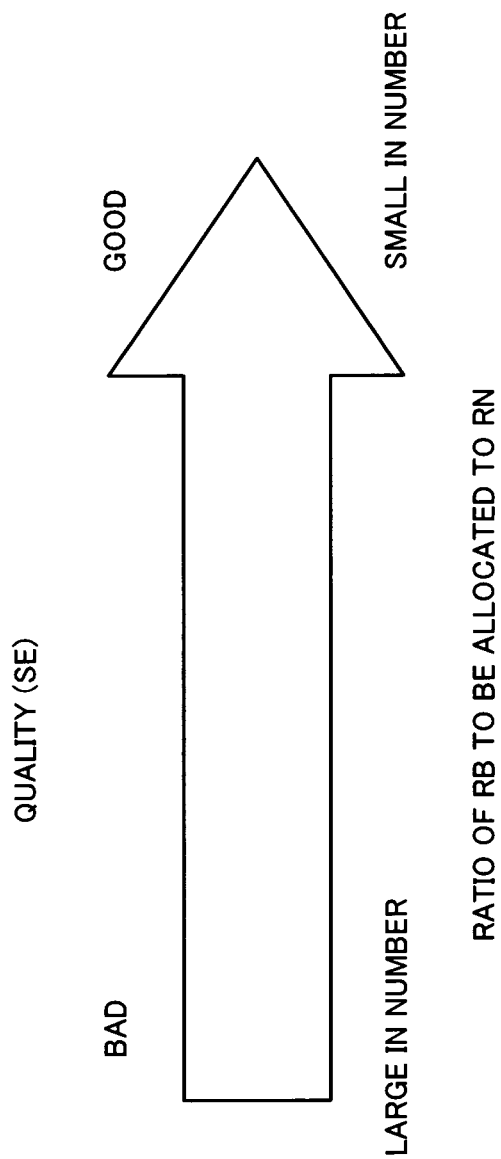
FIG. 4 is a diagram for explaining a relationship between frequency utilization efficiency and a ratio of allocated resource block to a radio relay station apparatus.

In a resource allocation method of this embodiment, the frequency bandwidth in the backhaul sub-frame is controlled based on the number of the backhaul sub-frames, the number of the mobile terminal devices, and the frequency utilization efficiency of the radio link, and the backhaul sub-frame is transmitted with the frequency bandwidth controlled in this manner. In this case, as shown in FIG. 4, when quality (SE) of eNB→RN link is good compared with that of eNB→macro UE link, frequency bandwidth is controlled to reduce an amount of Resource Block (RB) to be allocated to RN.

Thus, since the same data amount can be transmitted by RB being small in number, when the quality of eNB→RN link is better, by taking the frequency utilization efficiency of MCS into consideration, it can prevent allocating the resources to the relay node greater than needed. Accordingly, the throughput of the macro UE (whole cell) can be improved.

Figure 5:
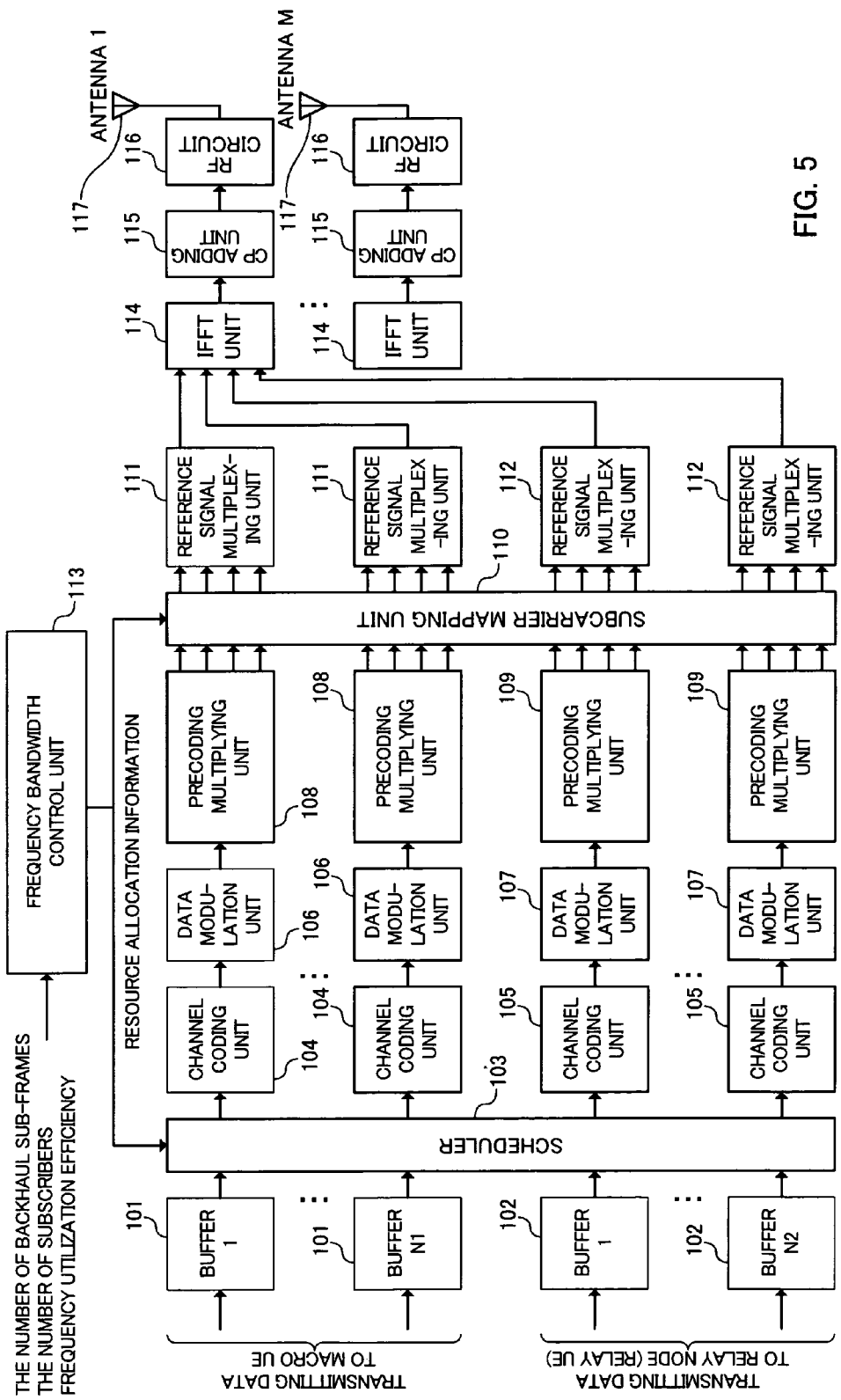
FIG. 5 is a block diagram showing a schematic structure of a radio base station apparatus according to an embodiment 1 of the present invention.

FIG. 5 is a block diagram showing a schematic structure of a radio base station apparatus according to an embodiment 1 of the present invention. The radio base station apparatus shown in FIG. 5 includes a transmitting unit and a receiving unit. Herein, only the transmitting unit side will be explained.

The radio base station apparatus shown in FIG. 5 is mainly composed of: buffers (1 to N1) 101 of transmitting data for macro UE; buffers (1 to N2) 102 of transmitting data for relay node; a scheduler 103, channel coding units 104 for transmitting data for macro UE; channel coding units 105 for transmitting data for relay node; data modulation units 106 for transmitting data for macro UE; data modulation units 107 for transmitting data for relay node; precoding multiplying units 108 for transmitting data for macro UE; precoding multiplying units 109 for transmitting data for relay node; a subcarrier mapping unit 110; reference signal multiplexing units 111 for transmitting data for macro UE; reference signal multiplexing units 112 for transmitting data for relay node; a frequency bandwidth control unit 113; Inverse Fast Fourier Transform (IFFT) units 114; Cyclic Prefix (CP) adding units 115; RF circuits 116; and antennas (1 to M) 117.

The buffer (1 to N1) 101 of transmitting data for macro UE stores data to be transmitted to the macro UE. The buffer (1 to N2) 102 of transmitting data for relay node stores data to be transmitted to the relay node.

The scheduler 103 schedules the data to be transmitted to the macro UE stored in the buffer (1 to N1) 101 of transmitting data for macro UE, and the data to be transmitted to the relay node stored in the buffer (1 to N2) 102 of transmitting data for relay node. The scheduler 103 schedules the data to be transmitted to the macro UE and the data to be transmitted to the relay node with the frequency bandwidth controlled by the frequency bandwidth control unit 113. Control by the frequency bandwidth control unit 113 will be described later.

The channel coding unit 104 for transmitting data for macro UE performs channel coding of the transmitting data for the macro UE. The channel coding unit 104 outputs the channel-coded data to the data modulation unit 106. The channel coding unit 105 for transmitting data for relay node performs channel coding of the transmitting data for the relay node. The channel coding unit 105 outputs the channel-coded data to the data modulation unit 107.

The data modulation unit 106 for transmitting data for macro UE modulates the channel-coded data. The data modulation unit 106 outputs the modulated data to the precoding multiplying unit 108. The data modulation unit 107 for transmitting data for relay node modulates the channel-coded data. The data modulation unit 107 outputs the modulated data to the precoding multiplying unit 109.

The precoding multiplying unit 108 for transmitting data for macro UE multiplies precoding weight to the modulated data. The precoding multiplying unit 108 outputs the data after multiplying the precoding weight to the subcarrier mapping unit 110. The precoding multiplying unit 109 for transmitting data for relay node multiplies precoding weight to the modulated data. The precoding multiplying unit 109 outputs the data after multiplying the precoding weight to the subcarrier mapping unit 110.

The subcarrier mapping unit 110 maps a frequency domain signal to a subcarrier based on resource allocation information. The subcarrier mapping unit 110 outputs the mapped data for macro UE to the reference signal multiplexing unit 111, and outputs the mapped data for relay node to the reference signal multiplexing unit 112.

The reference signal multiplexing unit 111 multiplexes a reference signal into the data for macro UE. The reference signal multiplexing unit 111 outputs the data into which the reference signal is multiplexed to the IFFT unit 114. The reference signal multiplexing unit 112 multiplexes a reference signal into the data for relay node. The reference signal multiplexing unit 112 outputs the data into which the reference signal is multiplexed to the IFFT unit 114.

The IFFT unit 114 performs an IFFT process for the signal into which the reference signal is multiplexed to convert the signal into a time domain signal. The IFFT unit 114 outputs the signal after the IFFT process to the CP adding unit 115. The CP adding unit 115 adds CP to the signal after the IFFT process. The CP adding unit 115 outputs the signal to which CP is added to the RF circuit 116. The RF circuit 116 performs a predetermined RF process for the signal to which CP is added, and then transmits the signal subjected to the RF process from the antenna (1 to M) 117 to the macro UE and/or the relay node.

The frequency bandwidth control unit 113 controls frequency bandwidth for macro UE/relay node, based on the number of backhaul sub-frames, the number of subscribers (macro UE, relay UE), and frequency utilization efficiency of the radio link (macro eNB→macro UE, macro eNB→relay node). In this case, as shown in FIG. 4, when quality (SE) of eNB→RN link is good compared with that of eNB→macro UE link, the frequency bandwidth is controlled to reduce an amount of the Resource Block (RB) to be allocated to RN. The frequency bandwidth control unit 113 outputs information on the frequency bandwidth (e.g., RB to be allocated to RN) to the scheduler 103 and the subcarrier mapping unit 110 as the resource allocation information.

More specifically, the frequency bandwidth control unit 113 calculates ratio (X) of RB to be allocated to RN in the backhaul sub-frame in accordance with the following expression (1).

$$X = \text{(frequency utilization efficiency of link from eNB to macro UE} \times \text{the number of relay UE)} / \{\text{(frequency utilization efficiency of link from eNB to macro UE} \times \text{the number of relay UE)} + \text{(frequency utilization efficiency of link from eNB to RN} \times \text{the number of macro UE)}\} \times \text{(total number of sub-frames for each frame/the number of backhaul sub-frames for each frame)} \quad (1)$$

Thus, in the resource allocation method according to this embodiment, the frequency bandwidth in the backhaul sub-frame is controlled based on the number of the backhaul sub-frames, the number of the mobile terminal devices, and the frequency utilization efficiency of the radio link, and the backhaul sub-frame is transmitted with the frequency bandwidth controlled in this manner. Accordingly it can prevent allocating resources to RN greater than needed, and thereby the throughput of the macro UE (whole of cell) can be improved.

Embodiment 2

In this embodiment, there will be explained the case where the frequency bandwidth in the backhaul sub-frame is controlled by the number of the backhaul sub-frames, the number of the mobile terminal devices, the frequency utilization efficiency of the radio link, and an offset for resource allocation based on the data amount in the buffer of the radio relay station apparatus. Herein, the frequency utilization efficiency means frequency utilization efficiency (Spectral Efficiency (SE)) in a Modulation and Coding Scheme (MCS) mode applied to a (macro eNB→macro UE)/(macro eNB→relay node) link.

In the backhaul sub-frame, the data transmitted from the macro eNB to the relay node is once queued in a traffic buffer of the relay node, and then is transmitted from the relay node to the relay UE in the normal sub-frame. Consequently, in this embodiment, a ratio (Y) of RB allocated to the relay node in the backhaul sub-frame is determined in consideration of the data amount in the traffic buffer of the relay node, in accordance with the following expression (2).

$$Y = \text{the ratio } (X) \text{ calculated by the above-mentioned expression (1)} + \text{offset} \quad (2)$$

Note that, in this case, the ratio (Y) may be calculated by adding the offset to the ratio calculated in accordance with the following expression (3).

$$\{\text{The number of relay UE/(the number of relay UE+the number of macro UE)}\} \times \text{(total number of sub-frames for each frame/the number of backhaul sub-frames for each frame)} \quad (3)$$

That is, in the resource allocation method of this embodiment, the offset for resource allocation is controlled based on the data amount in the buffer which stores transmitting data in the radio relay station apparatus; the offset is transmitted to the radio base station apparatus; the frequency bandwidth in the backhaul sub-frame is controlled based on the number of the backhaul sub-frames, the number of the mobile terminal devices, the frequency utilization efficiency of the radio link, and the offset; and the backhaul sub-frame is transmitted with the frequency bandwidth controlled in this manner.

Figure 6:
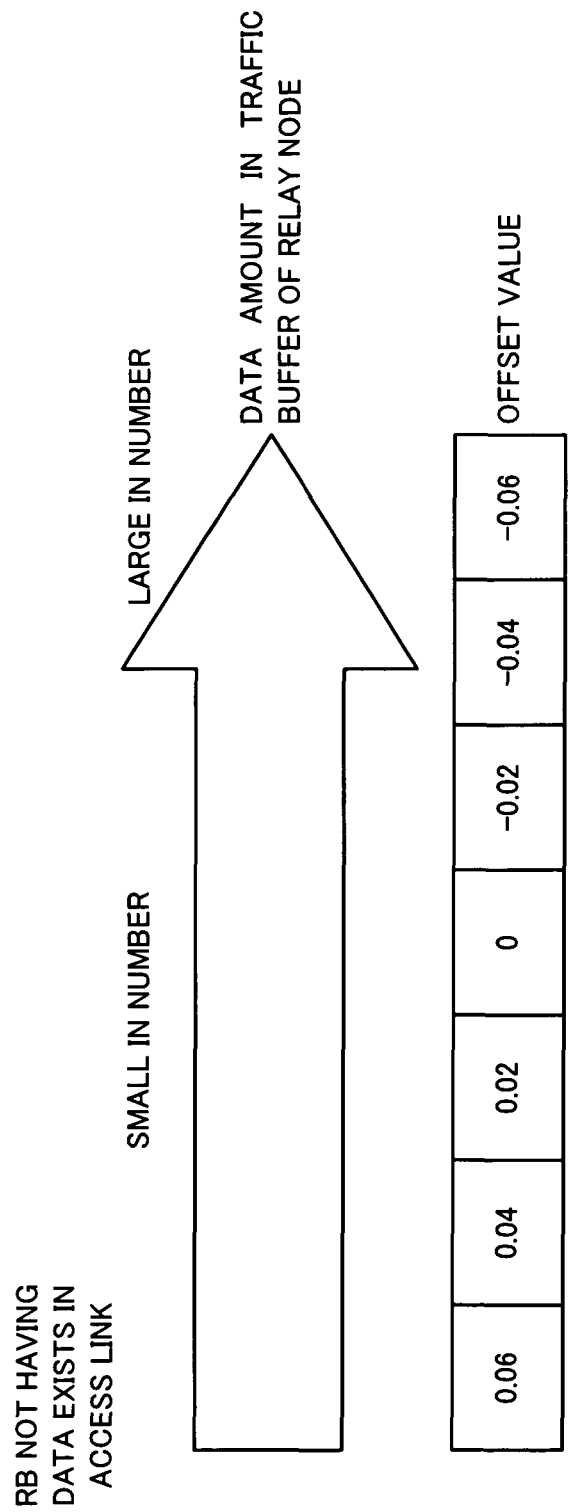
FIG. 6 is a diagram for explaining a relation between a data amount and offset in a buffer.

In this case of the control of offset, as shown in FIG. 6, offset of negative value is set when the data amount in the traffic buffer of the relay node is large, and offset of positive value is set when the data amount in the traffic buffer of the relay node is small and there is RB not having data in the relay node→relay UE link.

In this embodiment, first, the radio base station apparatus notifies resource allocating technique for adding the offset by Higher-layer signaling (e.g., Radio Resource Control (RRC)) to the radio relay station apparatus. Then, a radio relay station apparatus executes calculation of the offset based on the notified technique. Then, the radio relay station apparatus notifies the offset (Δ) to the radio base station apparatus by Higher-layer signaling (e.g., RRC) (or physical link signaling).

Thus, it becomes possible to allocate resources optimally by taking into consideration the data amount in the traffic buffer of the relay node. Accordingly, the throughput of the macro UE (whole cell) can be improved.

Figure 7:
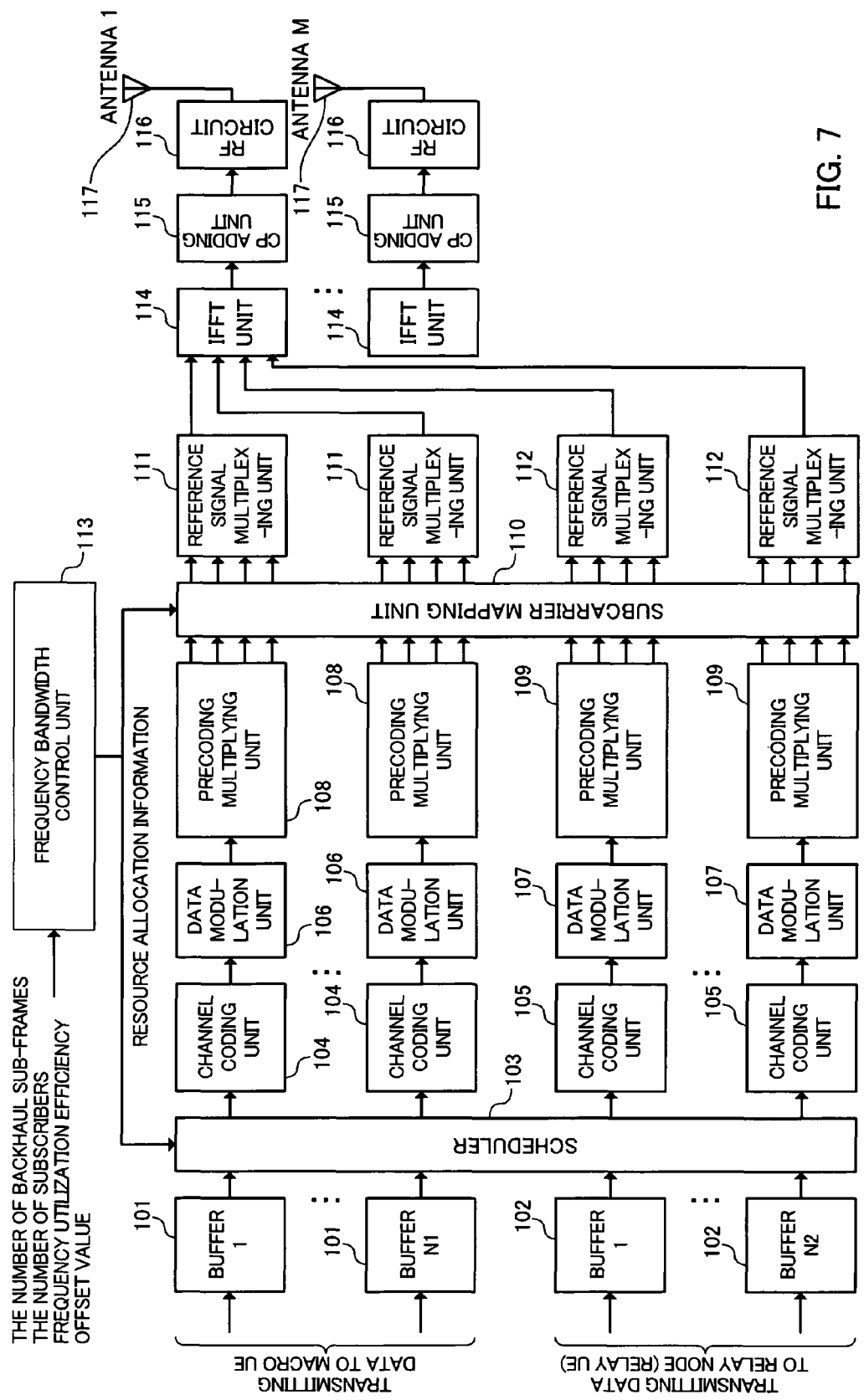
FIG. 7 is a block diagram showing a schematic structure of a radio base station apparatus according to an embodiment 2 of the present invention.

FIG. 7 is a block diagram showing a schematic structure of a radio base station apparatus according to an embodiment 2 of the present invention. In FIG. 7, the similar reference numeral as FIG. 5 is attached to the similar part as FIG. 5, and the detailed explanation thereof will be omitted. The radio base station apparatus shown in FIG. 7 includes a transmitting unit and a receiving unit. Herein, only the transmitting unit side is illustrated.

The frequency bandwidth control unit 113 calculates a ratio (Y) of RB to be allocated to the relay node in the backhaul sub-frame, using the offset corresponding to the data amount in the buffer in the relay node. The frequency bandwidth control unit 113 controls frequency bandwidth for macro UE/relay node, based on the number of backhaul sub-frames, the number of subscribers (macro UE, relay UE), frequency utilization efficiency of the radio link (macro eNB→macro UE, macro eNB→relay node), and offset (offset notified from the radio relay station apparatus). The frequency bandwidth control unit 113 outputs information on the frequency bandwidth (e.g., RB to be allocated to RN) to the scheduler 103 and the subcarrier mapping unit 110 as the resource allocation information.

More specifically, the frequency bandwidth control unit 113 calculates ratio (Y) of RB to be allocated to RN in the backhaul sub-frame in accordance with the following expression (2).

$Y$=the ratio ($X$) calculated by the above-mentioned expression (1)+offset        (2)

Figure 8:
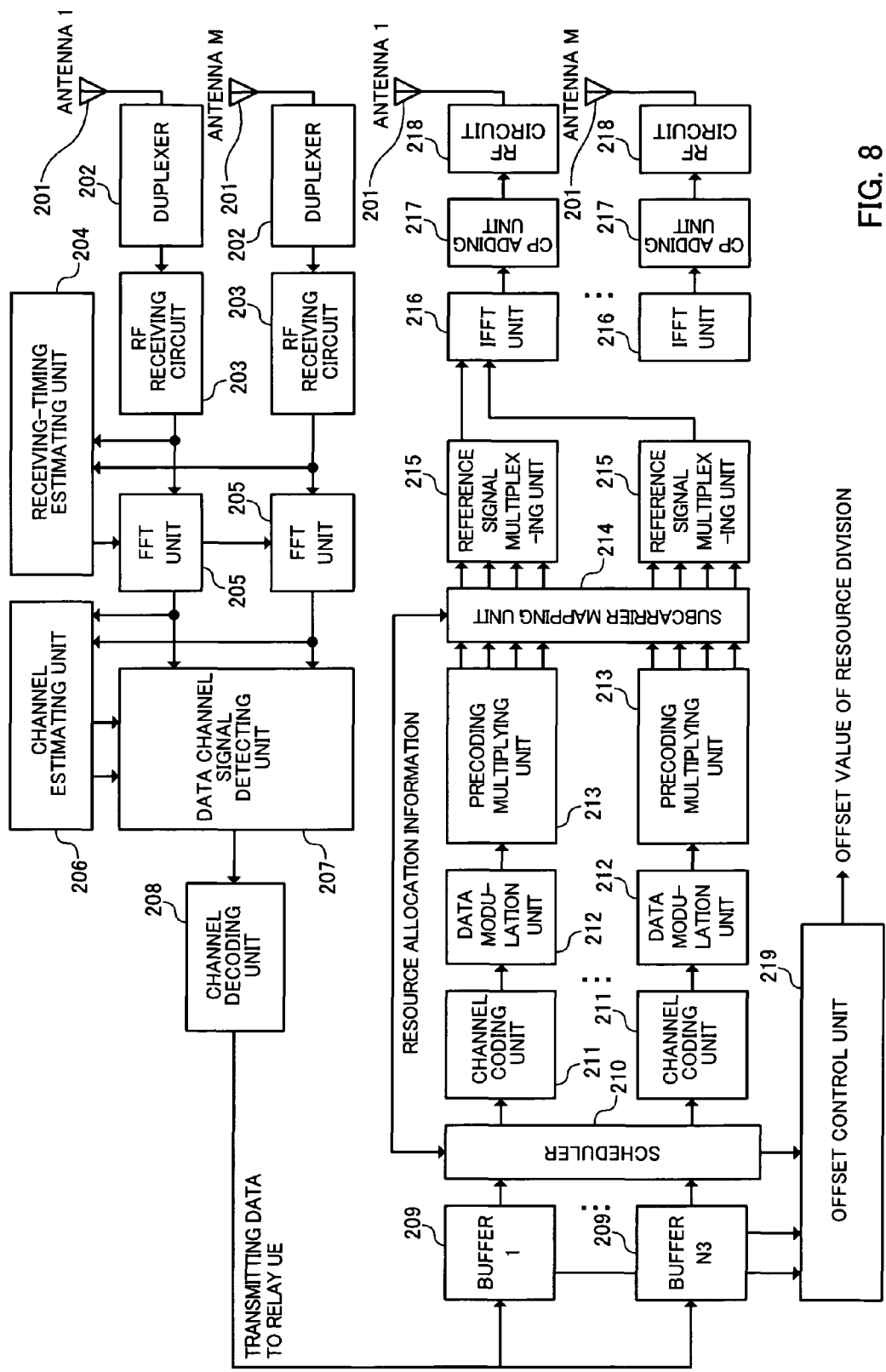
FIG. 8 is a block diagram showing a schematic structure of a radio relay station apparatus according to an embodiment 2 of the present invention.

FIG. 8 is a block diagram showing a schematic structure of a radio relay station apparatus according to the embodiment 2 of the present invention. The radio relay station apparatus shown in FIG. 8 includes a transmitting unit and a receiving unit.

The receiving unit of the radio relay station apparatus shown in FIG. 8 includes: antennas (1 to M) 201; duplexers 202; RF receiving circuits 203; a receiving-timing estimating unit 204; Fast Fourier Transform (FFT) units 205; a channel estimating unit 206; a data channel signal detecting unit 207; and a channel decoding unit 208.

The RF receiving circuit 203 performs an RF receiving process for a downlink signal from the macro eNB. The RF receiving circuit 203 outputs the signal after the RF receiving process to the FFT unit 205 and the receiving-timing estimating unit 204. The receiving-timing estimating unit 204 estimates receiving timing using the signal after the RF receiving process, and outputs the estimated value to the FFT unit 205.

The FFT unit 205 performs an FFT process for the received signal using the estimated value of receiving timing. The FFT unit 205 outputs the signal after the FFT process to the data channel signal detecting unit 207. Moreover, a reference signal after the FFT process is sent to the channel estimating unit 206. The channel estimating unit 206 performs channel estimation using the reference signal, and outputs a channel estimate to the data channel signal detecting unit 207.

The data channel signal detecting unit 207 detects a data channel signal using the channel estimate. The data channel signal detecting unit 207 outputs this data channel signal to the channel decoding unit 208. The channel decoding unit 208 decodes the data channel signal, and outputs the decoded data channel signal to the buffer (1 to N3) 209. In this manner, the data to be transmitted to the relay UE from the relay node is stored in the buffer 209.

The transmitting unit of the radio relay station apparatus shown in FIG. 8 is mainly composed of: the buffers (1 to N3) 209; a scheduler 210; channel coding units 211; data modulation units 212; precoding multiplying units 213; a subcarrier mapping unit 214; reference signal multiplexing units 215; IFFT units 216; CP adding units 217; RF circuits 218; antennas (1 to M) 201; and an offset control unit 219.

The buffer (1 to N1) 209 stores the data to be transmitted to the relay UE. The scheduler 210 schedules the data to be transmitted to the relay UE stored in the buffer (1 to N1) 209. The channel coding unit 211 performs channel coding of the transmitting data. The channel coding unit 211 outputs the channel-coded data to the data modulation unit 212.

The data modulation unit 212 modulates the channel-coded data. The data modulation unit 212 outputs the modulated data to the precoding multiplying unit 213. The precoding multiplying unit 213 multiplies precoding weight into the modulated data. The precoding multiplying unit 213 outputs the data after multiplying the precoding weight to the subcarrier mapping unit 214.

The subcarrier mapping unit 214 maps a frequency domain signal to a subcarrier based on resource allocation information. The subcarrier mapping unit 214 outputs the mapped data to the reference signal multiplexing unit 215. The reference signal multiplexing unit 215 multiplexes a reference signal into the data. The reference signal multiplexing unit 215 outputs the data into which the reference signal is multiplexed to the IFFT unit 216.

The IFFT unit 216 performs an IFFT process for the signal into which the reference signal is multiplexed to convert the signal into a time domain signal. The IFFT unit 216 outputs the signal after the IFFT process to the CP adding unit 217. The CP adding unit 217 adds CP to the signal after the IFFT process. The CP adding unit 217 outputs the signal to which CP is added to the RF circuit 218. The RF circuit 218 performs a predetermined RF process for the signal to which CP is added, and then transmits the signal subjected to the RF process from the antenna (1 to M) 201 to the relay UE.

The offset control unit 219 controls an offset for resource allocation based on a data amount in the buffer which stores the transmitting data. In this case, as shown in FIG. 6, the offset control unit 219 sets an offset of negative value when the data amount in the traffic buffer of the relay node is large, and sets an offset of positive value when the data amount in the traffic buffer of the relay node is small and there is RB not having data in the relay node→relay UE link. The relay node notifies this offset to eNB by Higher-layer signaling (e.g., RRC) (or physical link signaling).

In such composition, first, the eNB notifies a resource allocating technique for adding the offset to the relay node by Higher-layer signaling (e.g., RRC). Then, the relay node calculates the offset based on the data amount in the buffer, according to the notified technique. Subsequently, the relay node transmits this offset to the eNB. Subsequently, the eNB controls the frequency bandwidth in the backhaul sub-frame based on the number of the backhaul sub-frames, the number of the mobile terminal devices, the frequency utilization efficiency of the radio link, and the offset, and transmits the backhaul sub-frame with the frequency bandwidth controlled in this manner. Accordingly, since the resources can be allocated more optimally by taking into consideration the data amount in the traffic buffer of the relay node, the throughput of the macro UE (whole of cell) can be improved.

The embodiments described herein are to be considered in all respects merely as illustrative and not restrictive. The scope of the invention is indicated by the appended claims rather than the foregoing description, and all changes which come within the meaning and range of equivalents thereof are intended to be embraced therein.

Industrial Applicability

The present invention is utilized for a radio base station apparatus, a radio relay station apparatus and a resource allocation method of LTE-A system.

This application is based upon Japanese Patent Application No. 2010-087263 filed on Apr. 5, 2010, the entire contents of which are incorporated herein by reference.

The invention claimed is:

1. A radio base station apparatus comprising:
a frequency bandwidth control section configured to control a ratio of an amount of resource blocks to be allocated to a radio relay station apparatus to an amount of all resource blocks allocatable to the radio relay station apparatus and mobile terminal devices under a command of the radio base station apparatus in a backhaul sub-frame, based on a number of the backhaul sub-frames, a number of mobile terminal devices, and frequency utilization efficiency of a link from the radio base station apparatus to the radio relay station apparatus; and
a transmitting section configured to transmit a signal for the radio relay station apparatus by using the backhaul sub-frame based on the ratio controlled by the frequency bandwidth control section.

2. The radio base station apparatus according to claim 1, wherein the frequency bandwidth control section calculates the ratio, which is a ratio (X) of a resource block to be allocated to the radio relay station apparatus in the backhaul sub-frame in accordance with the following expression (1):

X=(frequency utilization efficiency of link from eNB to macro UE x the number of relay UE)/{(frequency utilization efficiency of link from eNB to macro UE×the number of relay UE)+(frequency utilization efficiency of link from eNB to RN×the number of macro UE)}×(total number of sub-frames for each frame/the number of backhaul sub-frames for each frame)

where eNB denotes the radio base station apparatus, macro UE denotes a mobile terminal device under the command of eNB, relay UE denotes a mobile terminal device under the command of the radio relay station apparatus, and RN denotes the radio relay station apparatus.

3. The radio base station apparatus according to claim 1, wherein the frequency bandwidth control section calculates the ratio, which is a ratio (Y) of a resource block to be allocated to the radio relay station apparatus in the backhaul sub-frame using an offset corresponding to a data amount in a buffer in the radio relay station apparatus.

4. A radio relay station apparatus comprising:
a buffer for storing transmitting data;
an offset control section configured to control an offset for resource allocation based on a data amount in the buffer;
a transmitting section configured to transmit the offset to a radio base station apparatus; and
a receiving section configured to receive a signal transmitted from the radio base station apparatus by a backhaul sub-frame, wherein
a ratio of an amount of resource blocks to be allocated to the radio relay station apparatus to an amount of all resource blocks allocatable to the radio relay station apparatus and mobile terminal devices under a command of the radio base station apparatus in a backhaul sub-frame, is controlled based on a number of the backhaul sub-frames, a number of mobile terminal devices, frequency utilization efficiency of a link from the radio base station apparatus to the radio relay station apparatus, and the offset.

5. A resource allocation method in a radio base station apparatus, the method comprising:
controlling a ratio of an amount of a resource blocks to be allocated to a radio relay station apparatus to an amount of all resource blocks allocatable to the radio relay station apparatus and mobile terminal devices under a command of the radio base station apparatus in a backhaul sub-frame, based on a number of the backhaul sub-frames, a number of mobile terminal devices, and frequency utilization efficiency of a link from the radio base station apparatus to the radio relay station apparatus; and
transmitting a signal for the radio relay station apparatus by using the backhaul sub-frame with the frequency bandwidth based on the ratio controlled by a frequency bandwidth control section.

6. The resource allocation method according to claim 5, wherein the ratio is a ratio (X) of a resource block to be allocated to the radio relay station apparatus in the backhaul sub-frame is calculated in accordance with the following expression (1):

X=(frequency utilization efficiency of link from eNB to macro UE x the number of relay UE)/{(frequency utilization efficiency of link from eNB to macro UE×the number of relay UE)+(frequency utilization efficiency of link from eNB to RN×the number of macro UE)}×(total number of sub-frames for each frame/the number of backhaul sub-frames for each frame)

where eNB denotes the radio base station apparatus, macro UE denotes a mobile terminal device under the command of eNB, relay UE denotes a mobile terminal device under the command of the radio relay station apparatus, and RN denotes the radio relay station apparatus.

7. A resource allocation method comprising:
controlling, in a radio relay station apparatus, an offset for resource allocation based on a data amount in a buffer which stores transmitting data;
transmitting, in the radio relay station apparatus, the offset to a radio base station apparatus;
controlling, in the radio base station apparatus, a ratio of an amount of all resource blocks to be allocated to the radio relay station apparatus in a backhaul sub-frame, based on a number of the backhaul sub-frames, a number of mobile terminal devices, frequency utilization efficiency of a link from the radio base station apparatus to the radio relay station apparatus, and the offset; and transmitting, in the radio base station apparatus, a signal for the radio relay station apparatus by using the backhaul sub-frame based on the ratio controlled.

* * * * *

UNITED STATES PATENT AND TRADEMARK OFFICE
CERTIFICATE OF CORRECTION

| | | |
|---|---|---|
| PATENT NO. | : 8,811,261 B2 | Page 1 of 1 |
| APPLICATION NO. | : 13/261458 | |
| DATED | : August 19, 2014 | |
| INVENTOR(S) | : Satoshi Nagata et al. | |

It is certified that error appears in the above-identified patent and that said Letters Patent is hereby corrected as shown below:

On the Title Page add:

-- (30) Foreign Application Priority Data

JP 2010-087263, April 5, 2010. --.

In the Claims:

At column 10, claim number 5, line number 26, "controlling a ratio of an amount of a resource blocks to be" should read -- controlling a ratio of an amount of resource blocks to be --.

Signed and Sealed this
Nineteenth Day of May, 2015

Michelle K. Lee
*Director of the United States Patent and Trademark Office*